US012703310B2

(12) United States Patent
Besta et al.

(10) Patent No.: US 12,703,310 B2
(45) Date of Patent: Aug. 11, 2026

(54) CABLE BINDER FOR VEHICLES, CABLE-BINDING ASSEMBLY, AND VEHICLE LAMP WITH THE ASSEMBLY

(71) Applicant: HELLA AUTOTECHNIK NOVA S.R.O., Mohelnice (CZ)

(72) Inventors: Petr Besta, Bouzov (CZ); Zdenek Bures, Slatinice (CZ); Tomas Galek, Namest na Hane (CZ); Matej Smolik, Ostrava Hrabuvka (CZ); Jan Suchy, Dubicko (CZ); Pavel Tinkl, Zabreh na Morave (CZ); Dusan Winkler, Mohelnice (CZ)

(73) Assignee: HELLA AUTOTECHNIK NOVA S.R.O., Mohelnice (CZ)

( * ) Notice: Subject to any disclaimer, the term of this patent is extended or adjusted under 35 U.S.C. 154(b) by 168 days.

(21) Appl. No.: 18/647,172

(22) Filed: Apr. 26, 2024

(65) Prior Publication Data

US 2024/0359645 A1 Oct. 31, 2024

(30) Foreign Application Priority Data

Apr. 28, 2023 (EP) .................................... 23170728

(51) Int. Cl.
*B60R 16/02* (2006.01)
*B65D 63/10* (2006.01)

(52) U.S. Cl.
CPC ...... *B60R 16/0215* (2013.01); *B65D 63/1027* (2013.01)

(58) Field of Classification Search
CPC . B60R 16/0215; B60R 16/02; B65D 63/1027; B65D 63/10; F16L 3/2332; F16L 3/243; H02G 3/32
USPC ........................................................ 174/72 A
See application file for complete search history.

(56) References Cited

U.S. PATENT DOCUMENTS 5,598,994 A * 2/1997 Olewinski ................ H02G 3/26 411/511
2007/0028426 A1 * 2/2007 Laporte .............. B65D 63/1063 24/16 PB
2015/0097089 A1 4/2015 Taylor et al.

FOREIGN PATENT DOCUMENTS

DE 19841438 A1 * 3/2000 ............ F16B 37/045
EP 0751597 A1 1/1997
EP 2266845 A1 * 12/2010 ........... B60Q 1/0088
JP 2003299230 A * 10/2003 ................ F16B 2/08
KR 20090007160 U 7/2009

* cited by examiner

*Primary Examiner* — Timothy J Thompson
*Assistant Examiner* — Guillermo J Egoavil
(74) *Attorney, Agent, or Firm* — WARNER NORCROSS + JUDD LLP

(57) ABSTRACT

Cable binder for vehicles, cable-binding assembly, and vehicle lamp with the assembly. The binder comprises a body for attachment to the vehicle, a strip for binding cables, and a securing mechanism for closing a section of the binder into a loop around the cables, wherein the section comprises at least a part of the strip and optionally a part of the body. This section is provided with at least one cable-guiding groove for fitting at least part of a perimeter of at least one cable, wherein the groove extends across the width of the section and is placed on the inner side of the loop when the section is closed into the loop. The binder can further comprise at least one rib for squeezing cables, the rib being oriented perpendicularly with respect to the groove.

12 Claims, 5 Drawing Sheets

13
11
12
14
6
5
2
1
8

13
11
14
6
5
1

CABLE BINDER FOR VEHICLES, CABLE-BINDING ASSEMBLY, AND VEHICLE LAMP WITH THE ASSEMBLY

CROSS-REFERENCE TO RELATED APPLICATIONS

The present application claims the benefit of European Patent Application No. 23170728.2, filed Apr. 28, 2023, the disclosure of which is incorporated by reference.

FIELD OF THE INVENTION

The present invention relates to cable binders for fixing cables connecting electrical components inside of vehicles. It especially relates to cable binders for use in vehicle lamps, such as headlamps or taillamps.

BACKGROUND OF THE INVENTION

In the state of the art, cable binders are used in automotive industry for securing bundles of cables, e.g., for powering headlight components or infotainment devices. The binders keep the cables at a desired position and keep them still during travel, which helps preventing damage to the cables by scraping or chafing them against their surroundings. Unsecured cables could be damaged as they repeatedly and over a long time move or vibrate while in contact with e.g., an edge of an adjacent vehicle component. This can lead to a necessity for replacing the cables or even a whole component, such as a headlight, once the cables become too damaged for a safe operation.

Standard cable binders known in the art use a zip tie bands for holding the cables tightly together. The zip tie can then be fixed to the vehicle by any means, e.g., by gluing, welding or by the zip tie itself or another zip tie. In automobile lamps, a known way of fixing the zip tie bands inside of the lamp is to provide them with a body, usually made from one piece of material with the zip tie. The body has a cylindrical opening, and the lamp casing is provided with a cylindrical metallic pin onto which the opening can be mounted.

A shortcoming of this solution is that the cables bound by the zip tie can often become twisted and/or can to some extent move in the zip tie. This can lead to cable damage, for example because they can vibrate and their sheath can thus become scraped by contact with another part of the vehicle.

It would therefore be desirable to come up with an improved cable binder solution which would remove or limit at least some of the problems of the known binders.

SUMMARY OF THE INVENTION

The shortcomings of the solutions known in the prior art are to some extent eliminated by cable binder for vehicles, the binder comprising a body for attachment to the vehicle and a strip for binding cables. The strip is fixed to the body, e.g., the binder can be from a single piece of material. The binder further comprises a securing mechanism for closing a section of the binder into a loop around the cables which are to be bound. The section comprises at least a part of the strip, it can also comprise a part of the body, e.g., its wall to which the strip is attached. When the loop is closed and tightened, the length of the strip which is a part of the loop might depend on the number of cables and their shape and diameter. The exact shape and size of the loop can depend on materials used, on properties of the cables, on features of the securing mechanism etc. The section comprises at least one groove for fitting at least part of a perimeter of at least one cable. For example, the groove can have a round shape, with a cross section substantially in the shape of a half circle, such that it can fit (a half of) a round cable. The groove extends across the width of the section and is placed on the inner side of the loop when the section is closed into the loop. The groove can therefore come into contact with at least some of the bound cables and can guide the cables. The width of the section can be the width of the strip, of the wall of the body forming part of the loop etc.

Cables bound by the loop run through the loop substantially in the direction of the width, and the grooves help keeping them straight, parallel to each other. As a result, the cables can be held more securely, and the loop is less likely to become loose during use. Such a loosening could e.g., occur if the cables were bound twisted with each other, so they would not run through the loop perpendicularly to the loop's cross section. Long term vibration due to the vehicle's operation can then shake the cables such that they become more aligned with each other, and the bundle of cables thus takes up less space. The loop is then too loose for the cables, doesn't hold them tightly enough, and the cables can move around more freely, can became damaged by scraping against their surroundings, can make noise etc. Providing the loop with the grooves in the present invention helps preventing this situation—the cables are tightened in a more orderly and more mutually aligned fashion, the bundle of cables is more secured, and the negative effects of loose cables are limited.

The strip can be made of plastic and its thickness can be chosen such that it is flexible enough to be closable into the loop while being strong enough to hold the cables secured over a long time, e.g., many years during a whole lifetime of a headlight. In can however be also made e.g., from metal, leather etc. The body can for example be a block of material provided with mechanism for attaching it to the vehicle, e.g., to an automobile lamp's casing. It is possible to provide at least one groove on the body and at least one groove on the strip. These grooves can then be on different sides of the inner side of the loop when closed, e.g., even opposite to each other, and the cables can thus by guided by the grooves on multiple sides of the cable bundle.

The section, which closes into the loop, can comprise at least two parallel ridges protruding from the strip and/or the body wherein the groove is between two adjacent ridges. These ridges thus extend in the direction of the width of the strip, along the desired direction of cables in the loop. The ridges preferably have blunt edges to prevent cable damage. A groove can also be partially formed next to a ridge, e.g., when the strip is bent such that it forms the other side of the groove when the loop is closed. If more than two ridges are provided, more than one groove can be formed between them.

The body can comprise a poka-yoke element for engaging with a complementary poka-yoke element provided in the vehicle, wherein the element of the body comprises a protrusion and/or a recess. Poke-yoke basically means that the element, or the two cooperating elements, can ensure mounting of the binder to the vehicle in one or more predetermined correct positions while incorrect positions are prevented. For example, only a single orientation of the binder with respect to the vehicle can be correct, and the mounting of the binder is then preferably possible in only this one orientation. The bound cables are then guided in position and orientation intended by the designer, regardless of skill, experience or attention of the workers providing the mounting. The poka-yoke elements can especially be two interlocking elements, such as a protrusion and a complementarily shaped recess, which can engage with each other when oriented correctly, and which make mounting less possible (e.g., requiring a suspicious or unnatural amount of destructive strength by an assembly line worker) when oriented incorrectly.

The securing mechanism can be a zip tie mechanism. This mechanism, also called cable tie, can be made unopenable, i.e., requiring destruction (e.g., snipping of the stripe) if the cables need to be unbound. It can also be made openable such that the loop can be opened and then closed again. Other securing mechanisms, such as utilizing Velcro or magnetic connections, can also be used.

The body optionally comprises an opening for mounting the binder onto a pin provided in the vehicle. Such a pin can e.g., be a fixed part a vehicle component, such as a lamp. The opening can be provided with arms for pressing against the pin and thus keeping the body on the pin by friction.

The body can alternatively comprise a pin for mounting into an opening provided in the vehicle. The opening can be a through hole, e.g., made in a thin layer of material, such as a metal sheet. The pin can then comprise resilient elements for bearing against the surroundings of the opening once pushed through and thus securing the pin in the opening. It can also be a cavity, wherein the pin comprises flexible or extendable elements for bracing against the cavity's wall to keep the pin in place.

When the pin and the opening is used, the opening is optionally mountable onto the pin in only one orientation of the opening with respect to the pin. The poka-yoke elements described above can be used to define this orientation.

The cable binder can be made of a plastic material containing a glass filler. PA66 with glass fibers can be used, as an example of a suitable material. A different filler can also be used, e.g., carbon fibers.

The binder can comprise at least one rib for squeezing cables, oriented perpendicularly with respect to the groove. The rib can thus be placed on the binder section which forms the inside of the loop when closed, so it can come into contact with the bound cables. The rib can for example by raised with respect to its surroundings by 0.1-3 mm, e.g., 0.2-2 mm, depending, among other factors, on number of cables, their diameter, material of their sheaths etc. The rib(s) can locally increase pressure on the cables by the loop, which can help securing the cables in place and prevent their shifting through the loop/shifting the loop along the cables.

There can in total be at least two ribs for squeezing cables, wherein each rib is oriented perpendicularly with respect to the groove. The cables can thus be squeezed at two places, with a less tight portion in between, which further limits movement of the cables in either direction through the loop.

The at least one rib can be on the body. For example, the body can contain the rib(s) while the strip contains the grooves. The at least one rib can be inside of the loop when the binder is closed into a loop around the cables. The rib(s) can then extend along the inner perimeter of the loop perpendicularly to the direction of cables bound by the loop.

The strip optionally comprises an anti-slip structure placed on the side of the strip for contacting the cables. A projecting or recessed pattern can for example be used on the strip. The pattern is preferably chosen such that it does not scrape or otherwise damage the cables while it keeps them from moving in the loop.

The shortcomings of the solutions known in the state of the art are also to some extent eliminated by a cable-binding assembly for vehicles which comprises the cable binder according to the invention and it comprises an element for mounting the body of the cable binder. The component can especially be a pin or an opening, wherein the body comprises an opening or a pin, as described above. The component can also be a larger unit, such as a frame for automobile lamp, an automobile lamp etc., having a part adapted for attaching the body, e.g., the pin or the opening.

The shortcomings of the solutions known in the state of the art are also to some extent eliminated by a vehicle lamp, e.g., an automobile lamp, which comprises the assembly.

The strip of the cable binder according to the invention can be attached to the body via a connection portion, which is a part of the body. The portion can comprise two branches, with a space in between, which are both connected to the body on one side and to the strip on their other side. Using such a connecting portion can provide the strip-body connection with some flexibility so the strip is much less likely to be broken off and the connecting portion can be bent to some extent when the loop is closed, which helps with tightly securing the cables. Thanks to the branching, the flexibility can be provided while the portion is wide enough to hold the cables along a larger portion of their length, which helps preventing breaking/sharply bending the cables at the binder. The connecting portion can alternatively or additionally be curved such that the loop, when closed, is formed next to the body. A wall of the body can then be a part of the loop and the bundle of cables can be guided close to the surface to which the body is attached.

BRIEF DESCRIPTION OF THE DRAWINGS

The invention is further described by means of exemplary embodiments thereof, which are described with reference to the accompanying drawings, in which.

DETAILED DESCRIPTION OF THE CURRENT EMBODIMENTS

Figures 1, 2:
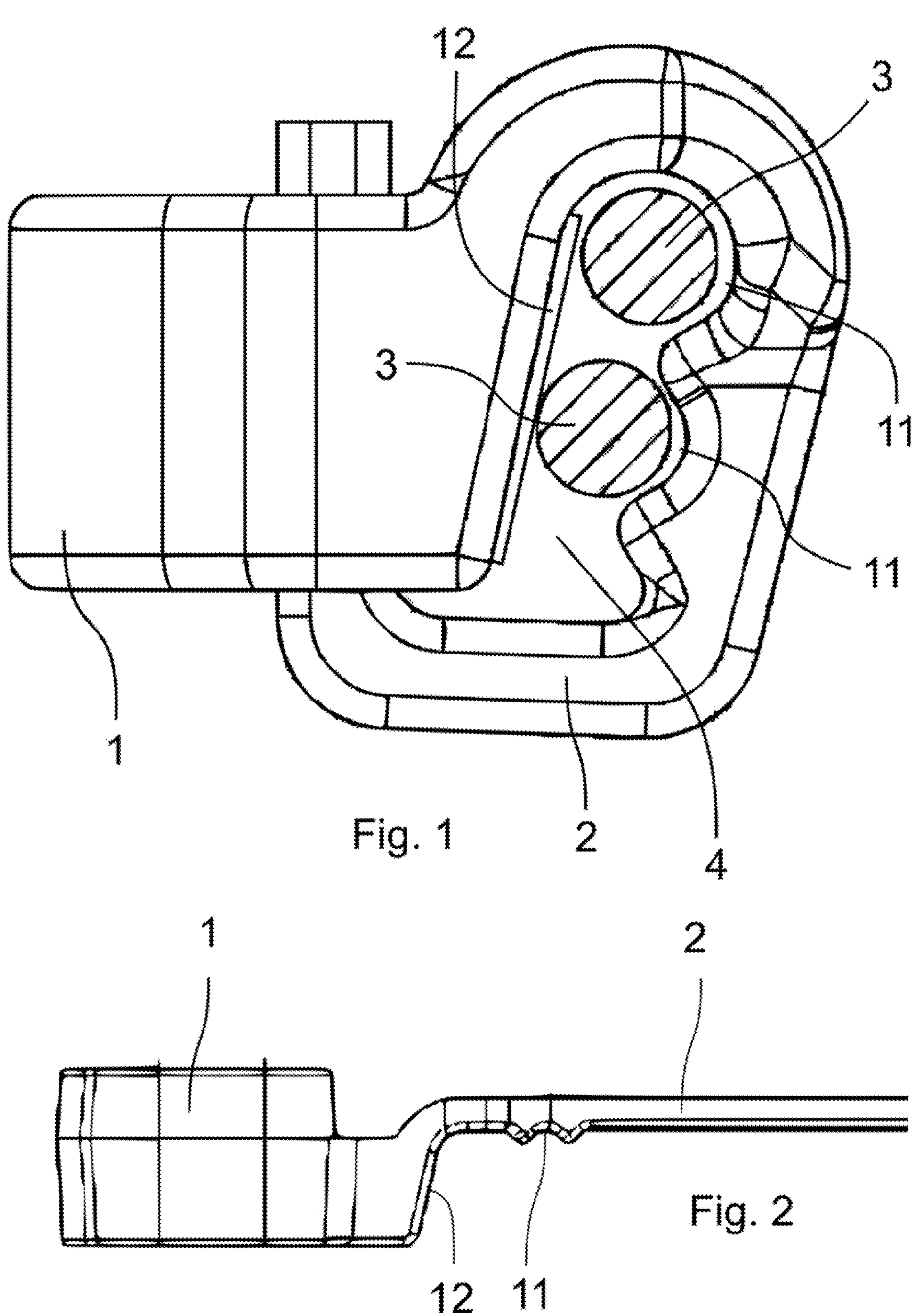
FIG. 1 schematically shows a side view an exemplary cable binder according to the invention, wherein the cable binder is closed into a loop around two cables which are both fixed in place by a groove.
FIG. 2 schematically shows a side view of the cable binder from FIG. 1 in its open state and without the cables, wherein two ridges delimiting the grooves can be seen.
Figures 3, 4:
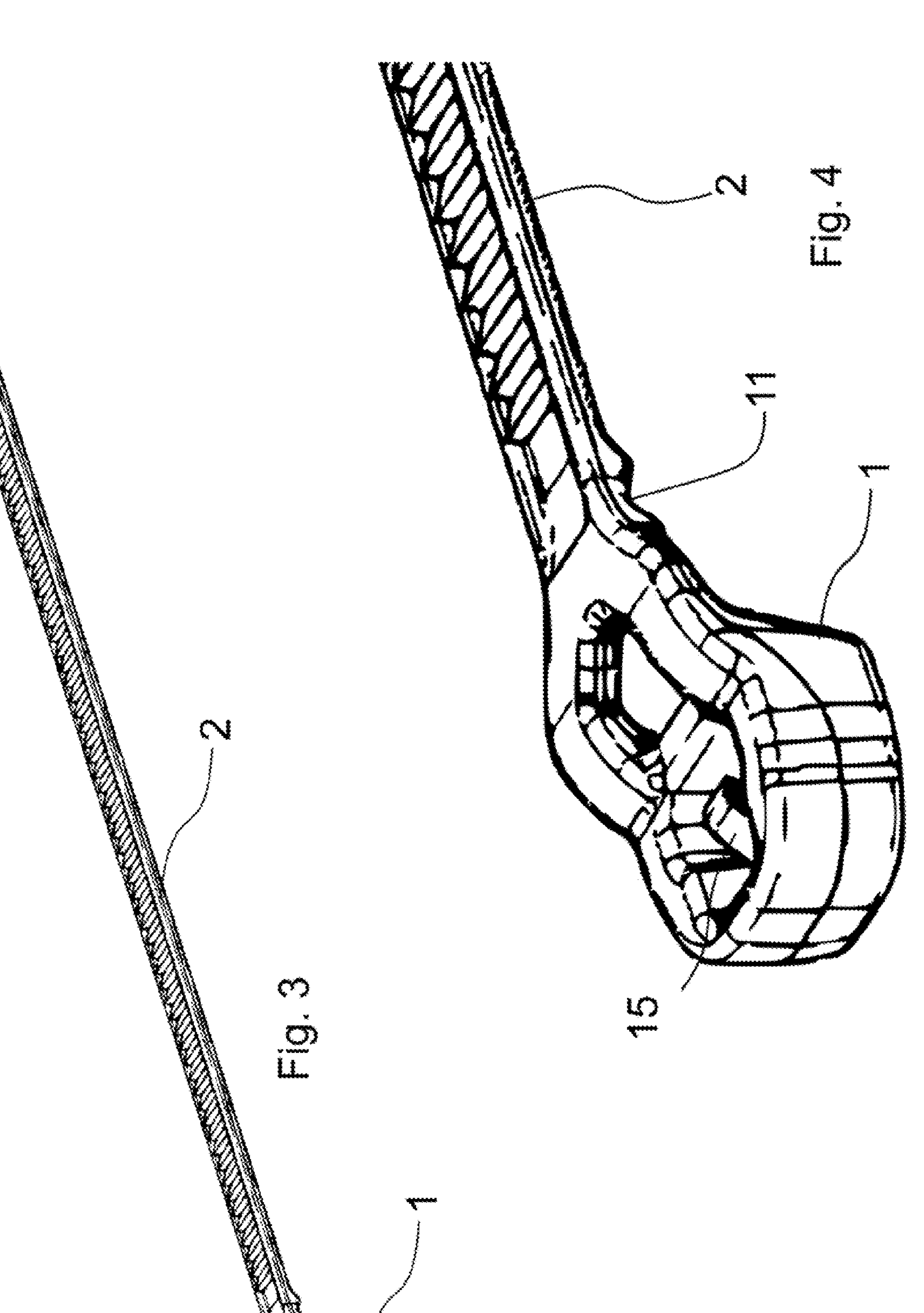
FIG. 3 shows a schematic perspective view of the binder from FIG. 1.
FIG. 4 shows a detail of body of the binder from FIG. 3.

The invention will be further described by means of exemplary embodiments with reference to the respective drawings.

An embodiment of the cable binder for vehicles according to the invention is depicted in FIGS. 1 to 4 and 10. The binder comprises a body 1 fixedly attached to a strip 2, wherein the body 1 serves for attaching the binder to a vehicle and the strip 2 serves for creating a closed loop 4 around the cables 3 to be bound. A securing mechanism 7 is provided for closing the loop 4. Part of the loop 4 can also be formed from the body 1 (see FIG. 1). In the depicted embodiments, the securing mechanism 7 is a zip tie mechanism. That is, the body 1 comprises a through hole 14 for the strip 2, the strip 2 comprises a ratchet—a line of teeth, and the through hole 14 comprises a pawl 15 for engaging with the ratchet. The ratchet is preferably on the side of the strip 2 which does not come into contact with the cables 3 bound by the binder. Otherwise, the teeth could in some cases damage the cables 3. The free end of the strip 2 can thus by pushed through the through hole 14, with the pawl 15 and teeth being shaped such that they do not prevent movement in this one direction, but it cannot be pulled back—the pawl 15 prevents that by engaging the teeth. Therefore, once the cables 3 are placed next to the body 1 on the strip 2 and the loop 4 is created around them, it can only be tightened, it cannot generally be loosened or opened without destroying the strip 2. It is however also possible to provide a releasable zip tie securing mechanism 7 where the pawl 15 can be selectively disengaged from the ratchet.

A different kind of closure, which can be both a kind that cannot be opened without destruction or a kind that can be opened and closed repeatedly, can also be used. For example, a hook-and-loop fastener, magnetic fastener, buckle-type fastener, a row of snap fasteners on the strip 2 with at least one complementary snap fastener one the body 1, the other side of the strip 2 etc., a fastener with an adhesive, or other type of fastener can be used.

There is a groove 11 provided on the strip 2, on its side which is in contact with cables 3 during use. The groove 11 extends through the whole width of the strip 2 and is sized such that at least one cable 3 can at least partially fit into the groove 11. That is, the cross-section of the groove 11 is such that a cable 3 can be guided by the groove 11, as can be seen in FIG. 1. The groove 11 can be a recessed part of the strip 2, however more preferably it is formed between two parallel protruding ridges. In the depicted embodiment, there is one groove 11 formed between two ridges and another formed between a ridge and a bent portion of the strip 2. In different embodiments, there can by any number of grooves 11 and ridges provided for guiding one or more cables 3. In some embodiments, a groove 11 can have a cross section such that multiple cables 3 can fit into the groove 11.

The grooves 11 can be placed on the part of the strip 2 close to the body 1, e.g., on a first third of the length of the strip 2, or even on a first tenth of the length etc. Depending on the number of cables 3 to be bound and their diameters, the groove 11 closest to the body 1 can e.g., be less than 2 cm from the body 1. The binder can be for example made from a plastic material, e.g., containing a filler, such as glass fibers. The body 1 is preferably made from one piece of material together with the strip 2, e.g., by injection molding. A suitable material can for example be polyamide or nylon 66, preferably with the glass filler. The strip 2 can be provided with an anti-slip structure 13 on its side meant for contact with the cables 3. This structure can for example be a mesh or grooving provided on the strip 2 surface. The structure can increase the roughness of the surface and thus limit slipping of the cables 3 along the strip 2. The structure can also be made from a different material, e.g., silicone or rubber.

In the depicted embodiment, the body 1 of the binder further comprises a rib 12 for squeezing the cables 3 bound by the binder, wherein the rib 12 is perpendicular to the cables 3. The rib 12 is thus placed on a part of the binder which is in (or intended for) contact with the cables 3, e.g., on the inner side of the loop 4 when the loop 4 is closed and tightened around the cables 3. In the embodiment shown in FIG. 1, as well as in the alternative embodiment from FIG. 6, there are two parallel ribs 12 provided and they are placed on the body 1. In other embodiments, the rib(s) 12 can however be at least partially placed on the strip 2, e.g., after the last ridge or groove 11 in the direction towards the free end of the strip 2. In embodiments where the ribs 12 are placed on the same part of the length of the strip 2 as the ridges, the ribs 12 are preferably interrupted at the ridges such that the ridge itself has the same height along its whole length, not locally increased by the rib(s) 12.

The rib(s) 12 can have a width which is larger than the width of the grooves 11, such that they squeeze the cables 3 on a larger portion of the cables' 3 length and thus do not damage them. For example, the width of each rib 12 can be at least two or at least three times as large as the diameter of cables 3 which are expected to be bound by the binder. Preferably, there are two ribs 12 on the body 1 and they are as far from each other as possible (see FIG. 6) by the body's 1 width. The height of the rib(s) 12 can for example be from 0.1 to 3 mm, depending on the number of cables 3 to be bound, diameter of the cables 3, material of their sheath(s), intended placement of the binder etc.

Figure 10:
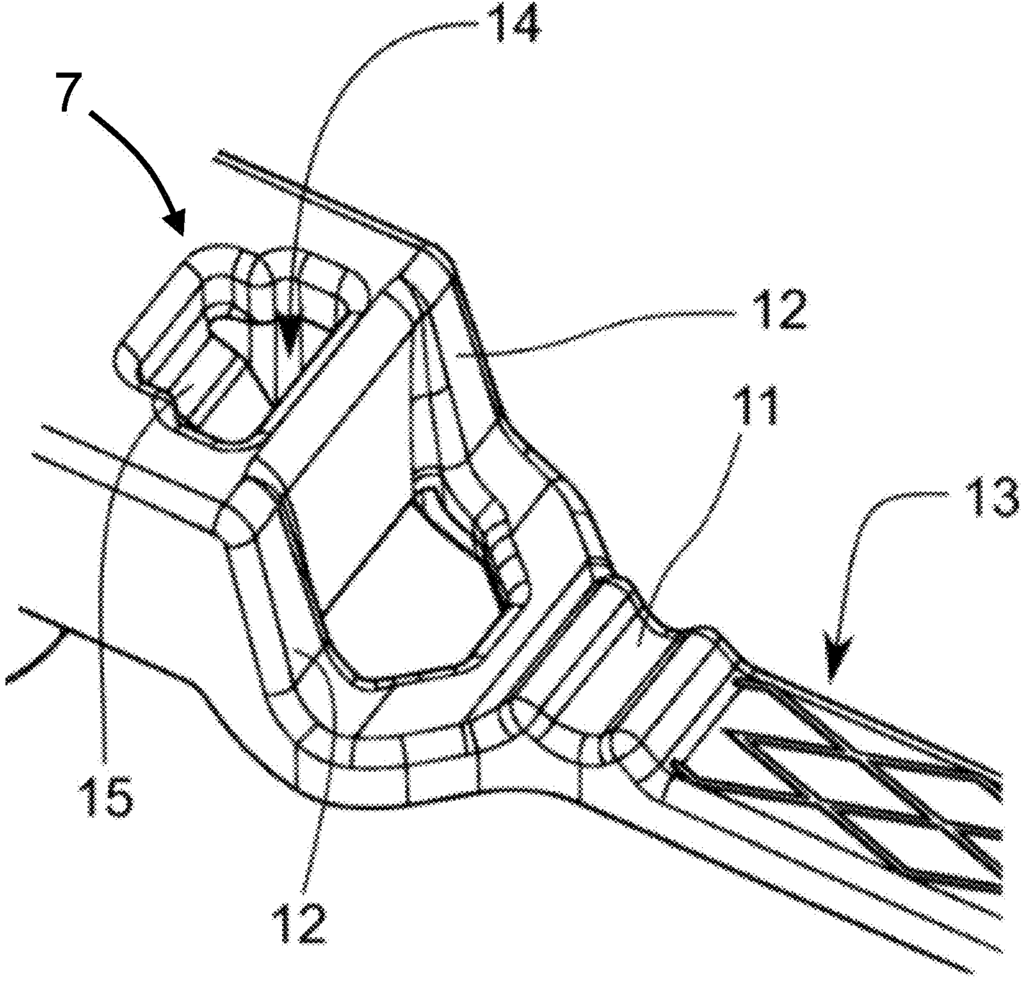
FIG. 10 schematically shows a detailed view on a connecting portion of the body, which has two branches, and two ribs and a groove for securing and guiding cables.

In embodiments with the branched connecting portion, as described in more detail below and as shown in FIG. 10, the ribs can have substantially the same width as the branches, e.g., the same width±25%. This ensures a sufficient contact area with the cables 3 while the two ribs 12 are still separated by a large enough gap for holding the cables 3. The height of the rib(s) 12 can for example be from 0.1 to 3 mm, depending on the number of cables 3 to be bound, diameter of the cables 3, material of their sheath(s), intended placement of the binder etc. The width of the ribs 12 is measured in direction perpendicular to the plane of FIG. 1, their height is the smaller dimension measurable in FIG. 1, i.e., the one measured on the rib 12 in direction towards the grooves 11 and ridges. Length of the ribs 12 would then be the longer dimension visible in FIG. 1, along the surface from which the ribs protrude. FIG. 10 then shows the branched of the connecting portion, and the arrangement of the two parallel ribs 12 can be seen in this figure. Each rib 12 can basically be an extended portion of the respective branch, protruding from the body 1 towards the inside of the loop 4.

The strip 2 can be attached to the body 1 via a connecting portion of the body 1 comprising a hole for increasing flexibility of the point of attachment. The connecting portion can thus have two branches which are at one end firmly connected to the body 1 and at the other and are joined together and connected firmly to the strip 2 (see e.g., FIG. 4, 7 or 8). The size of the hole can be such that the strip 2 cannot be inserted therein, in order to prevent insertion of the strip 2 into incorrect place when mounting the binder and binding cables 3 with it. The connecting portion, whether it is branched or not, can also be bent such that the loop 4, when being closed around a bundle of cables 3, is placed next to the body 1, i.e., substantially at the same height as the body 1, when viewed from the side. Such a shape of the connecting portion, when the strip 2 is straight before closing the loop 4, can be seen e.g., in FIG. 2 or 4. This curved/bent shape can help guiding the bound cables 3 closer to the surface of the automobile to which the body 1 is attached. This can help with saving space in the automobile, e.g., inside of a lamp, and can help preventing damage to the cables 3. In other words, when the loop 4 is closed around some cables 3 and the binder is viewed in the direction along these cables 3 (e.g., the sideview from FIG. 1 (closed loop) or FIG. 2 (strip before closing)), most of the loop 4 is preferably located next to the body 1, i.e., less than half of the volume taken by the loop 4 extends vertically (i.e., up and/or down) beyond the body 1. The volume can be the inner volume of the loop 4, e.g., as can be seen in FIG. 1, where the loop 4 extends above/beyond the body 1 approximately only by the thickness of the strip 2, with the space inside of the loop 4 being substantially the same height as the body 1.

The ribs 12 and/or the grooves 11 or the ridges forming the grooves 11 preferably have blunted edges, at least on places that can come into contact with cables 3. The groove (s) 11 or some of them can be placed on the body 1, i.e., the grooves 11 do not necessarily have to be on the strip 2. In such embodiments, the grooves 11 on the body 1 extend across the width of the body 1, i.e., in the same direction as they would on the strip 2, such that the cables 3 bound by the binder can by guided by the groove(s) 11, preferably in a substantially straight line. Generally, the grooves 11 are placed on the section of the binder which is closable into the loop 4 and at least some of the grooves 11 are inside of the loop 4 and can come into contact with the cables 3. This section of the binder preferably comprises a part of the body 1 as well as at least part of the strip 2 (as is depicted in FIG. 1). In some embodiments, the strip 2 can however form the loop 4 by itself, e.g., when the securing mechanism 7 is entirely placed on the strip 2. Example of such a mechanism can be a hook-and-loop fastener, with the hook portion on one side of the strip 2 and the loop portion on the other side. This section of the binder can also generally comprise the rib(s) 12, which can be placed on a different part of the section, e.g., on the opposite part of the loop 4 such that the cables 3 are forced towards the groove(s) 11 by the rib(s) 12.

Mounting of the body 1 to the vehicle can be done in any possible way, several examples of which are given below. Any mounting arrangement can be used together with the cable-binding part of the binder, as described above. In the embodiment from FIGS. 1 to 4, the mounting arrangement is not depicted. The body 1 can thus be attached to the vehicle e.g., by gluing or welding, via a magnetic attachment, or it can be provided with a mechanical mounting arrangement, such as one of three depicted in FIGS. 6 to 8.

Figures 5, 6:
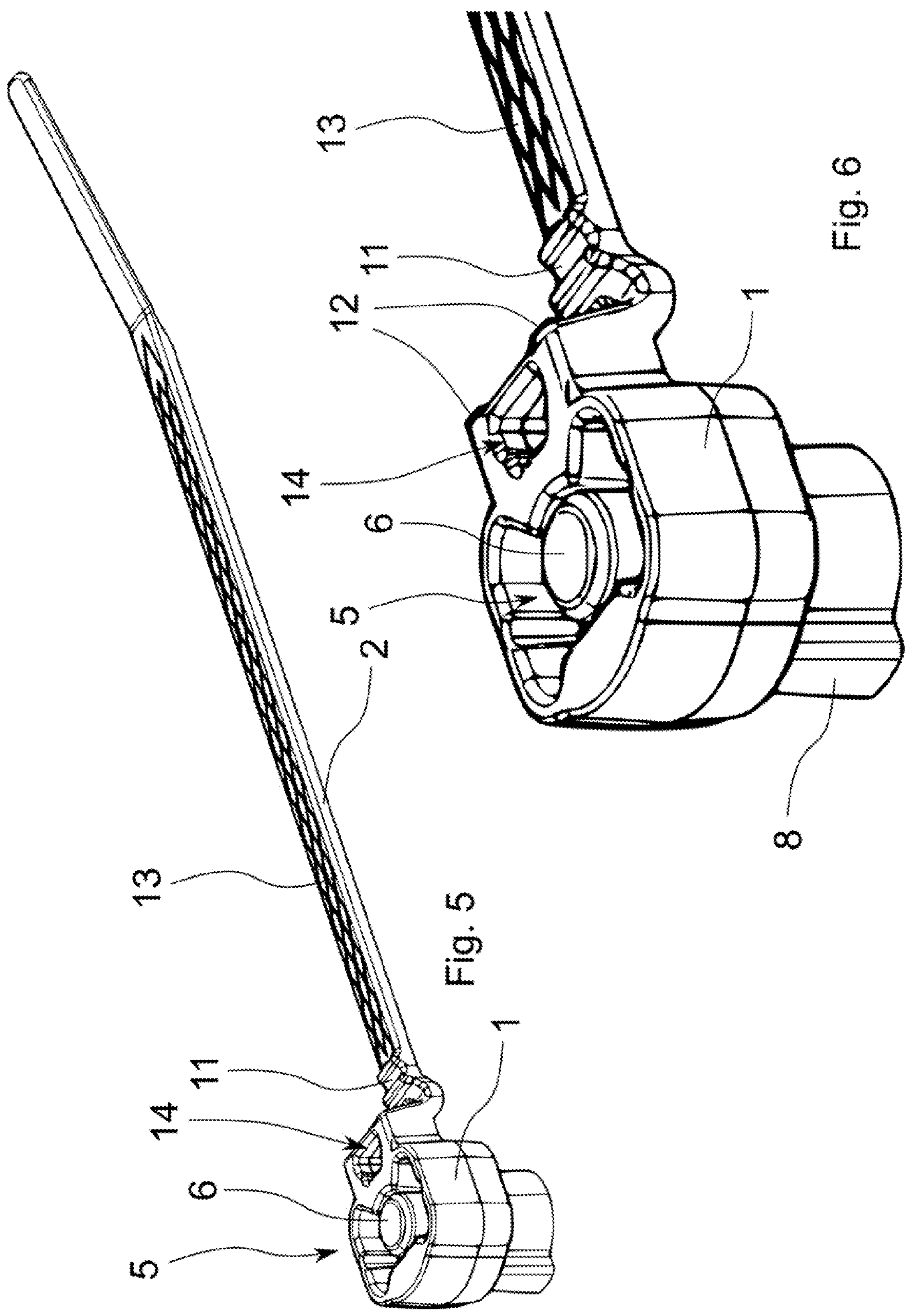
FIG. 5 shows a schematic perspective view of an embodiment of the cable binder, wherein the body of the binder is mounted onto a pin fixed inside of a (not-shown) vehicle.
FIG. 6 shows a detail of body of the binder from FIG. 5.

In general, the mounting can be done by a pin 6 and an opening 5 for receiving the pin 6, wherein the pin 6 can be a part of the body 1 (e.g., FIGS. 7 and 8) or a part of the vehicle (FIG. 6), and the opening 5 is located on the other part, i.e., on the vehicle or the binder's body 1. Preferably, the pin 6 and the opening 5 are both provided with a poka-yoke element 8 ensuring that the pin 6 can only be inserted into the opening 5 in a desired orientation, e.g., a single correct orientation, while other possible orientations prevent the insertion. Specifically, the poka-yoke elements 8 can be a recess on one of the parts and a projection on the other part, wherein the recess is complementary shaped to the projection such that they can lock or engage with each other in the correct position(s) only. In FIG. 6, it can be seen that the pin 6 is provided with a projection oriented along its axis and the opening 5 in the body 1 has a corresponding recess. The opening 5 in the body 1 then has arms for pressing against the pin 6 and thus creating friction for keeping the body 1 on the pin 6.

Figures 7, 8, 9:
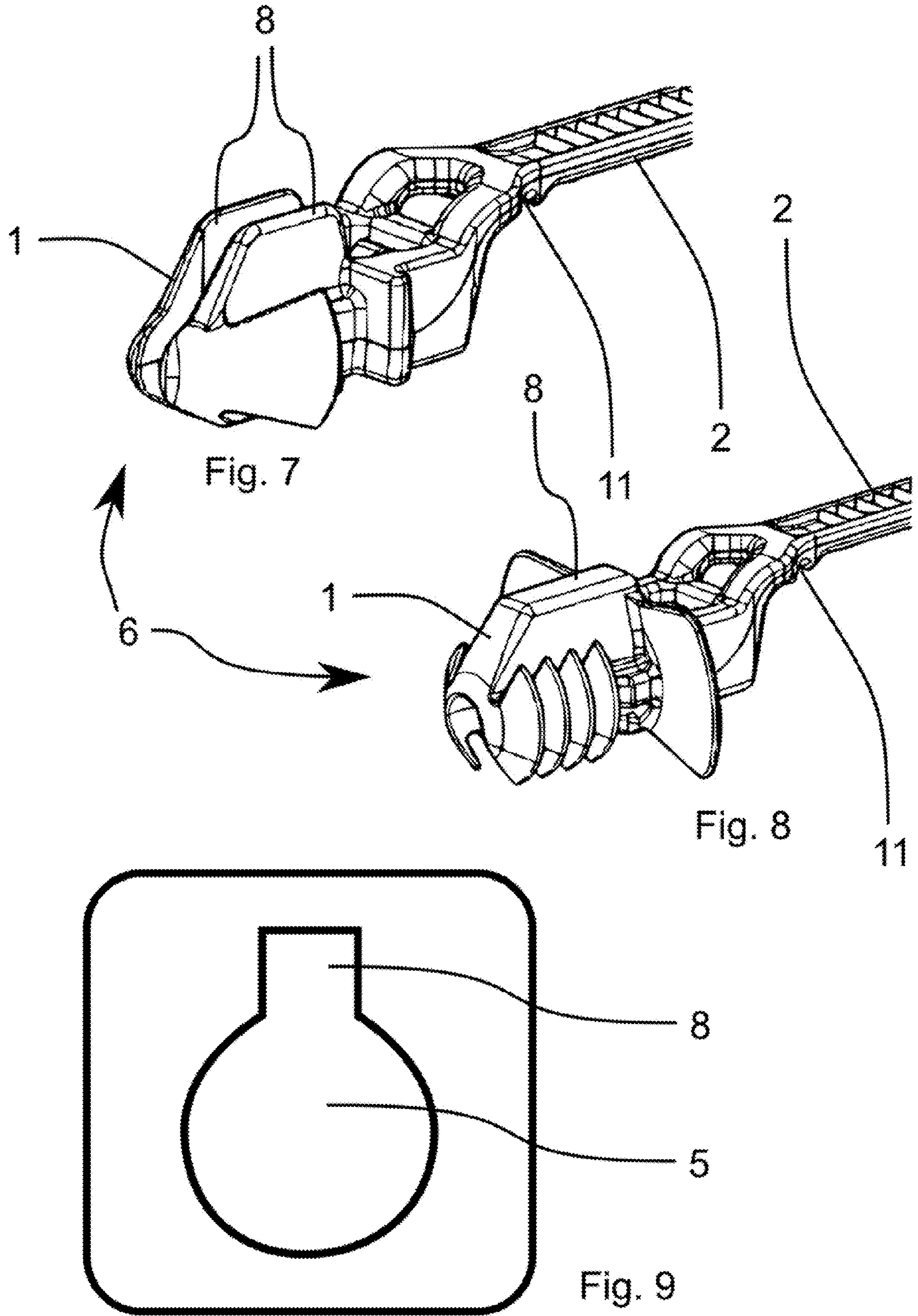
FIG. 7 shows a schematic perspective view of another embodiment of the cable binder, where the body comprises a pin for insertion into an opening provided in the vehicle.
FIG. 8 shows a schematic perspective view of an alternative embodiment to the binder from FIG. 7.
FIG. 9 shows a schematic drawing of the opening for receiving the pin of the body of the binder from FIG. 7 or 8.

In FIG. 7, the pin 6 is divided in half by a slit which enables the two halves to be elastically deformed when inserting the pin 6 into the opening 5. The pin 6 is shaped such that it is narrow towards its free end and it widens towards the strip 2, wherein there is a sharp decrease/step in its diameter such that when the pin 6 is being inserted, the halves are pushed closer together and the pin 6 can pass through the opening 5, and after full insertion when the step passes through the opening 5, the halves are flexibly pushed apart and reverse movement of the pin 6 is prevented be their back wall substantially perpendicular to the direction of insertion. This embodiment can especially be used when the body 1 needs to be attached to a relatively thin piece of material via a through hole opening 5 (see FIG. 9). For example, attaching cables 3 to a metallic heat sink can be realized with this embodiment of cable binder, or attaching to a wall of some component such as a dashboard or lamp. The poka-yoke element 8 in this embodiment is a protrusion on the pin 6, which is also divided by the slit, and a corresponding recess is provided in the opening 5.

In the embodiment from FIG. 8, the pin 6 is provided with at least one fin, preferably multiple fins. In the exemplary embodiment, there are 4 circular fins adapted for engagement against the wall(s) of the opening 5 and/or hitching by the surroundings of the opening 5 when the respective fin is pushed all the way through the opening 5. There are also two flaps extending substantially perpendicularly to the pin's axis which serve as a stop for inserting the pin 6 into the opening 5. Both the embodiments from FIG. 7 and from FIG. 8 can be used together with the opening 5 as depicted in FIG. 9.

The cable binder can be a part of a cable-binding assembly, which further comprises a component for mounting the binder by its body 1. The component, e.g., a part of a wall of an automobile lamp, a part of a dashboard, part of automobile interior lining etc., can thus especially comprise a pin 6 for an opening 5 of the body 1, or can comprise an opening 5 (e.g., as depicted in FIG. 9) for a pin 5 of the body 1. The assembly can be a part of an automobile lamp, such as a headlight, taillight, interior lamp, illuminated front grille, rear combination lamp, car body lighting, position line light, fog light, etc.

LIST OF REFERENCE NUMERALS

1 body
2 strip
3 cable
4 loop
5 opening
6 pin
7 securing mechanism
8 poka-yoke element
11 groove
12 rib
13 anti-slip structure
14 through-hole
15 pawl The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles “a,” “an,” “the,” or “said,” is not to be construed as limiting the element to the singular.

The invention claimed is:

1. A cable binder for vehicles, the cable binder comprising:

a body for attachment to the vehicle; and a strip for binding cables, the strip including a first portion which is fixed to the body, wherein the binder further comprises a securing mechanism for securing a second portion of the strip to the body, thereby forming a loop around the cables, wherein the loop comprises at least a part of the strip, wherein the loop also comprises at least one groove for fitting at least part of a perimeter of at least one cable, wherein the groove extends across the width of the loop and is placed on the inner side of the loop when the strip is closed into the loop, wherein the binder comprises at least one rib for squeezing the cables, the rib being oriented perpendicularly with respect to the groove.

2. The cable binder according to claim 1, further comprising at least two parallel ridges protruding from the strip and/or the body, wherein the groove is between two adjacent ridges of the at least two parallel ridges.

3. The cable binder according to claim 1, wherein the body comprises a poka-yoke element, wherein the poka-yoke element of the body comprises a protrusion and/or a recess.

4. The cable binder according to claim 1, wherein the securing mechanism is a zip tie mechanism.

5. The cable binder according to claim 1, wherein the body comprises an opening for mounting the binder onto a pin.

6. The cable binder according to claim 5, wherein the opening is mountable onto the pin in only one orientation of the opening with respect to the pin.

7. The cable binder according to claim 1, wherein the binder is made of a plastic material containing a glass filler.

8. The cable binder according to claim 1, wherein the binder in total comprises at least two ribs for squeezing cables, wherein each rib is oriented perpendicularly with respect to the groove.

9. The cable binder according to claim 1, wherein the at least one rib is on the body.

10. The cable binder according to claim 1, wherein:

the at least one rib is inside of the loop when the binder is closed into the loop around the cables; and the at least one rib extends along the inner perimeter of the loop perpendicularly to the direction of cables bound by the loop.

11. The cable binder according claim 1, wherein the strip comprises an anti-slip structure placed on the side of the strip for contacting the cables.

12. A cable-binding assembly for vehicles comprising:

the cable binder according to claim 1; and a component for attaching of the body of the cable binder.

* * * * *